July 2, 1929.  S. G. CARMEAN ET AL  1,718,944
CHICK FOUNT
Filed July 7, 1928
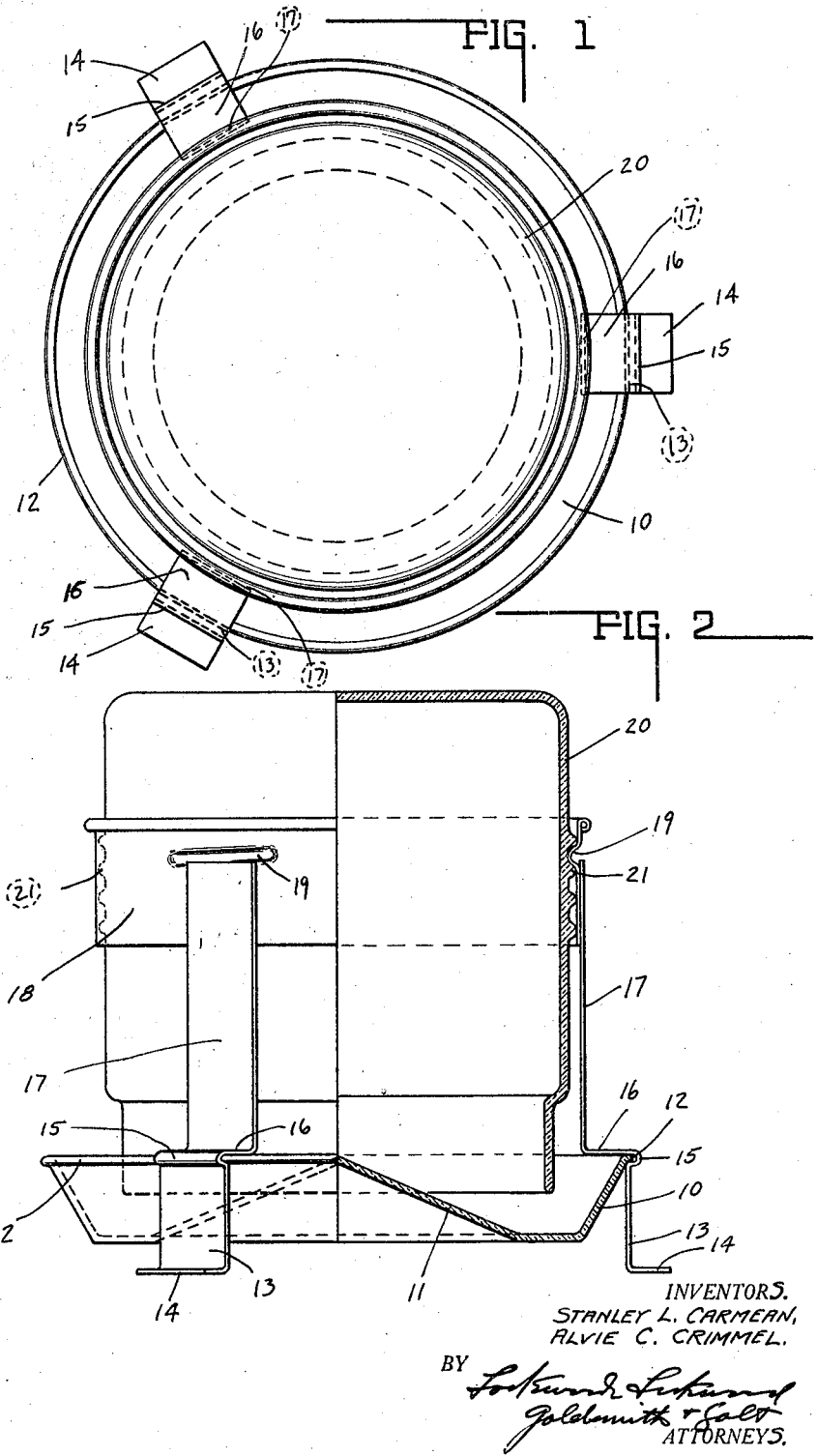
INVENTORS.
STANLEY L. CARMEAN,
ALVIE C. CRIMMEL.
BY
ATTORNEYS.

Patented July 2, 1929.

1,718,944

UNITED STATES PATENT OFFICE.

STANLEY G. CARMEAN, OF ADA, OHIO, AND ALVIE C. CRIMMEL, OF HARTFORD CITY, INDIANA, ASSIGNORS OF ONE-THIRD TO SNEATH GLASS COMPANY, OF HARTFORD CITY, INDIANA, A CORPORATION.

CHICK FOUNT.

Application filed July 7, 1928. Serial No. 291,068.

This invention relates to a chick fount for maintaining within limits a constant supply of feed or water for chickens and the like.

One feature of the invention resides in the means for supporting both the pan or feed trough and the glass jar or reservoir mounted thereover upon a single support including a plurality of supporting legs.

Another feature of the invention resides in the provision of annular corrugations or threads about the jar or reservoir adapted to cooperate with the supporting member or legs for removably supporting the jar or reservoir in adjusted relation with respect to the pan or feed trough.

The full nature of the invention will be more clearly understood from the accompanying drawings and the following description and claims.

Fig. 1 is a top plan view looking down upon the chick fount. Fig. 2 is a side elevation thereof with a portion shown in central vertical cross section.

In the drawings there is illustrated a chick fount comprising a feed pan having a conically shaped central portion indicated at 11 and an upwardly flared peripheral side portion terminating in the annular bead 12. Said feed pan is supported in position spaced from the ground or main support by a plurality of legs 13 comprising the outwardly turned feet 14 and grooves or recesses 15 adapted to receive the bead 12 of the feed pan for supporting the same thereon. Said legs are turned inwardly at 16 so as to terminate in an upright 17 which is connected at its upper end with the annular ring or band 18 having an inwardly extending annular bead 19 formed therein.

The glass jar, container or reservoir 20 is inverted and mounted above the feed pan so that the open end or mouth thereof is spaced a given distance from the lower surface of the feed pan for permitting the feed or water contained therein to pass into the feed pan as it is removed therefrom in the usual manner.

The jar or reservoir 20 is provided about its sides with a plurality of outwardly projecting screw threads 21 formed on the outer surface thereof intermediate its ends. By means of this arrangement, the position of the mouth of the jar may be readily adjusted with respect to its height from the feed pan for decreasing or increasing the level of the liquid or feed in the feed pan. This is done by merely rotating the jar so that it will screw up or down within the band 18.

It will also be noted that a single support is provided for maintaining the feed trough up off of the ground and the jar or reservoir above the feed trough including cooperating means on the supporting member for not only maintaining the jar in adjusted relation with respect to the pan but permitting its ready removal therefrom.

The invention claimed is:

1. A fount including a pan, a container mounted thereover, and a supporting member associated with said pan and provided with a projection for engaging screw threads formed on said container about the side wall thereof spaced intermediate its ends for permitting relative adjustment between said container and pan.

2. A fount including a pan, a container mounted above said pan, a plurality of spring metal legs positioned about the periphery of said pan and spaced from each other for supporting said pan above the lower ends thereof, said legs being provided with a groove therein, a projection formed about the periphery of said pan for engagement in said groove, an annular band secured to the upper ends of said legs above said pan and having inwardly extending projections formed thereabout, and screw threads formed in said container about the side wall thereof spaced between the top and bottom for receiving the projections of said band, whereby the rotation of said container will permit its removal and adjustment with respect to said pan.

In witness whereof we have hereunto affixed our signatures.

STANLEY G. CARMEAN.
ALVIE C. CRIMMEL.